(12) United States Patent
Oyama

(10) Patent No.: US 10,564,279 B2
(45) Date of Patent: Feb. 18, 2020

(54) SAR DATA SEARCH APPARATUS, METHOD, AND RECORDING MEDIUM

(71) Applicant: NEC Corporation, Minato-ku, Tokyo (JP)

(72) Inventor: Hiroshi Oyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 206 days.

(21) Appl. No.: 15/545,416

(22) PCT Filed: Feb. 17, 2016

(86) PCT No.: PCT/JP2016/000806
§ 371 (c)(1),
(2) Date: Jul. 21, 2017

(87) PCT Pub. No.: WO2016/136189
PCT Pub. Date: Sep. 1, 2016

(65) Prior Publication Data
US 2018/0011188 A1    Jan. 11, 2018

(30) Foreign Application Priority Data
Feb. 25, 2015 (JP) .................................. 2015-034759

(51) Int. Cl.
*G01S 13/90* (2006.01)
*G06F 16/907* (2019.01)
*G01S 13/00* (2006.01)

(52) U.S. Cl.
CPC ........ *G01S 13/9023* (2013.01); *G06F 16/907* (2019.01)

(58) Field of Classification Search
None
See application file for complete search history.

(56) References Cited

U.S. PATENT DOCUMENTS 4,321,601 A * 3/1982 Richman ............. G01S 13/9023
342/191
5,923,278 A * 7/1999 Poehler ............... G01S 13/9023
342/191

(Continued)

FOREIGN PATENT DOCUMENTS

CN    101551809    10/2009
JP    2000-003436 A    1/2000

(Continued)

OTHER PUBLICATIONS

International Search Report for PCT Application No. PCT/JP2016/000806, dated May 17, 2016.

(Continued)

*Primary Examiner* — Bernarr E Gregory

(57) ABSTRACT

In order to enable to change a search condition of a set of SAR data, depending on a purpose of generating InSAR data, an SAR data search method according to an exemplary aspect of the invention includes: receiving an input of a search condition comprising a search purpose and an observation date/time condition, switching the observation date/time condition to be used as the search condition, depending on the search purpose, and extracting, from a metadata storage unit configured to store metadata comprising an observation date/time associated with identification information of an SAR data, the identification information of a set of the SAR data that satisfies the search condition, and outputting the extracted identification information of each piece of the SAR data in the set.

11 Claims, 11 Drawing Sheets

(56) References Cited

U.S. PATENT DOCUMENTS

| | | | |
|---|---|---|---|
| 5,930,799 A * | 7/1999 | Tamano | G06F 16/00 |
| 5,995,681 A * | 11/1999 | Lee | G01C 11/02 |
| | | | 356/139.03 |
| 6,011,505 A | 1/2000 | Poehler et al. | |
| 6,337,654 B1 * | 1/2002 | Richardson | G01S 7/412 |
| | | | 342/25 A |
| 7,777,666 B2 * | 8/2010 | Gregory | G01S 13/90 |
| | | | 342/175 |
| 2004/0160353 A1 | 8/2004 | Cirillo et al. | |
| 2005/0057391 A1 * | 3/2005 | Forsley | G01S 13/9023 |
| | | | 342/25 A |
| 2006/0215935 A1 * | 9/2006 | Oldroyd | G01C 11/00 |
| | | | 382/294 |
| 2006/0273946 A1 * | 12/2006 | Krikorian | G01S 13/90 |
| | | | 342/25 A |
| 2006/0293854 A1 * | 12/2006 | Chiou | G01S 13/9035 |
| | | | 701/301 |
| 2008/0050009 A1 | 2/2008 | Maruya | |
| 2008/0291081 A1 | 11/2008 | Nonaka et al. | |
| 2009/0237297 A1 * | 9/2009 | Davis | G01S 13/9023 |
| | | | 342/25 A |

FOREIGN PATENT DOCUMENTS

| | | |
|---|---|---|
| JP | 2000-231571 A | 8/2000 |
| JP | 2003-269957 A | 9/2003 |
| JP | 2004-021921 A | 1/2004 |
| JP | 2007-256134 A | 10/2007 |
| JP | 2008-046107 A | 2/2008 |
| JP | 2013-231843 A | 11/2013 |

OTHER PUBLICATIONS

English translation of Written opinion for PCT Application No. PCT/JP2016/000806.

Japanese Office Action for JP Application No. 2017-501900 dated May 29, 2018 with English Translation.

* cited by examiner

Fig. 3

(b) IN CASE WHERE GENERATING DInSAR IS SELECTED

PURPOSE OF GENERATING InSAR
○ GENERATE DSM
● GENERATE DInSAR

DESIGNATE OBSERVATION DATE/TIME
MASTER DATA
YYYY/MM/DD
SLAVE DATA
YYYY/MM/DD (a) IN CASE WHERE GENERATING DSM IS SELECTED

PURPOSE OF GENERATING InSAR
● GENERATE DSM
○ GENERATE DInSAR

DESIGNATE OBSERVATION DATE/TIME
MASTER DATA
YYYY/MM/DD

SAR DATA SEARCH APPARATUS, METHOD, AND RECORDING MEDIUM

This application is a National Stage Entry of PCT/JP2016/000806 filed on Feb. 17, 2016, which claims priority from Japanese Patent Application 2015-034759 filed on Feb. 25, 2015, the contents of all of which are incorporated herein by reference, in their entirety.

TECHNICAL FIELD

The present invention relates to an SAR data search apparatus, a method, and a recording medium configured to search a set of SAR data depending on a purpose of generating InSAR (Interferometric SAR) data from many pieces of SAR (Synthetic Aperture Radar) data.

BACKGROUND ART

SAR data are data obtained by emitting a microwave from a synthetic aperture radar loaded in a flying object such as an airplane and a satellite toward the earth's surface, and observing a wave reflected from the earth's surface. Unlike observation by visible light, observation by this method is not affected by clouds, and is available day and night. Therefore, observation by this method is widely used as a remote sensing technique.

As a technique applying the SAR data, there is an interferometric SAR technique, in which interference processing is performed on a pair of SAR data (a set of master data and slave data), which is obtained by observing a same observation point at different two times or in different two directions. It is possible to generate and use digital surface model (DSM) data from InSAR data to be generated by using this technique. Further, it is also possible to generate and use differential InSAR (DInSAR) data, which is obtained by removing terrain fringes from InSAR data, for analysis of crustal deformation at two times or the like.

Nowadays, a frequency at which a representative earth observation satellite such as LANDSAT observes a same point is about once per several weeks. In order to improve the low frequency of observations, there is an action that many small satellites loaded with a lightweight and inexpensive sensor are launched to increase the frequency of observations. When this action is realized, a frequency of launching small satellites loaded with an SAR sensor increases in the future, and it is anticipated that many pieces of SAR data are distributed resultantly.

When many pieces of SAR data are distributed, the number of choices on pairs of SAR data when InSAR data are generated increases. Therefore, it is conceivably possible to generate InSAR data with higher accuracy when it is possible to select an optimum pair of SAR data.

High-accuracy InSAR data are necessary in order to generate high-accuracy DSM data or DInSAR data. It is desirable to use a pair of SAR data, which is selected to minimize a vertical baseline length, in order to generate high-accuracy InSAR data. As illustrated in FIG. 10, a vertical baseline length is a length of a line perpendicular to a line connecting a position of a satellite at which slave data are observed and an observation point, drawn from a position of a satellite at which master data are observed. As the vertical baseline length increases, it is less likely that SAR data may interfere. It is not possible to generate accurate InSAR data in an area where SAR data do not interfere. In view of the above, it is desirable to use a pair of SAR data that is selected to minimize the vertical baseline length.

Further, it is desirable to change a pair of SAR data, depending on a purpose of generation when InSAR data are generated.

For instance, in a case where InSAR data are generated for the purpose of generating DSM data, it is desirable to use a pair of SAR data that satisfies the following conditions:
   An observation date/time of master data is near an expected date/time; and
   An interval between observation dates/times of master data and slave data is small.

The second condition is a condition for use in minimizing an area where it is not possible to generate accurate InSAR data. As the interval between observation dates/times of a pair of SAR data increases, a change in the earth's surface condition increases. When a change in the earth's surface condition increases, the pair of SAR data cannot interfere with each other, and an area where it is not possible to generate accurate InSAR data increases. In view of the above, it is desirable to make the interval between observation dates/times of master data and slave data small.

On the other hand, in a case where InSAR data are generated for the purpose of analyzing crustal deformation at two times, it is desirable to use a pair of SAR data that satisfies the following conditions:
   An observation date/time of master data is near an expected date/time of master data; and
   An observation date/time of slave data is near an expected date/time of slave data.

PTL 1 describes a method of selecting a pair of SAR data, based on a length of a baseline connecting between two satellites that are arbitrarily selected from a plurality of satellites, for the purpose of extracting altitude information from the pair of SAR data.

CITATION LIST

Patent Literature

[PTL 1] Japanese Laid-open Patent Publication No. 2007-256134

SUMMARY OF INVENTION

Technical Problem

However, in the method described in PTL 1, observation dates/times of SAR data are not considered when data are selected. Therefore, in a case where a pair of SAR data whose observation dates/times are far from each other is selected, an area where it is not possible to generate accurate InSAR data may increase, and it may be difficult to extract altitude information. Further, in a case where generating DInSAR data is a purpose, it is necessary to use a pair of SAR data, whose times are far from each other, therefore, it is not possible to select a pair by the method described in PTL 1.

An object of the present invention is to provide an SAR data search apparatus, a method, and a recording medium, which enable to change a search condition of a pair of SAR data, depending on a purpose of generating InSAR data.

Solution to Problem

For settling the above-mentioned problem, an SAR data search apparatus according to an exemplary aspect of the invention comprises: a condition input means for receiving an input of a search condition comprising a search purpose and an observation date/time condition, a search means for switching the observation date/time condition to be used as the search condition, depending on the search purpose, and extracting, from a metadata storage unit configured to store metadata comprising an observation date/time associated with identification information of an SAR data, the identification information of a set of the SAR data that satisfies the search condition, and an output means for outputting the extracted identification information of each piece of the SAR data in the set.

And, an SAR data search method according to an exemplary aspect of the invention comprises: receiving an input of a search condition comprising a search purpose and an observation date/time condition, switching the observation date/time condition to be used as the search condition, depending on the search purpose, and extracting, from a metadata storage unit configured to store metadata comprising an observation date/time associated with identification information of an SAR data, the identification information of a set of the SAR data that satisfies the search condition, and outputting the extracted identification information of each piece of the SAR data in the set.

And, a computer readable recording medium recorded with an SAR data search program according to an exemplary aspect of the invention which causes a computer to implement: a condition input function of receiving an input of a search condition comprising a search purpose and an observation date/time condition, a search function of switching the observation date/time condition to be used as the search condition, depending on the search purpose, and extracting, from a metadata storage unit configured to store metadata comprising an observation date/time associated with identification information of an SAR data, the identification information of a set of the SAR data that satisfies the search condition, and an output function of outputting the extracted identification information of each piece of the SAR data in the set.

Advantageous Effects of Invention

According to an SAR data search apparatus, a method, and a recording medium of the present invention, it is possible to change a search condition of a pair (a set) of SAR data, depending on a purpose of generating InSAR data. Then, it is possible to search a pair (a set) of SAR data optimum for a purpose of generation.

BRIEF DESCRIPTION OF DRAWINGS

FIG. 3 shows a diagram illustrating an example of display by a user end device in the second example embodiment of the present invention;

DESCRIPTION OF EMBODIMENTS

[First Example Embodiment]

First of all, the first example embodiment of the present invention is described.

Figure 1:
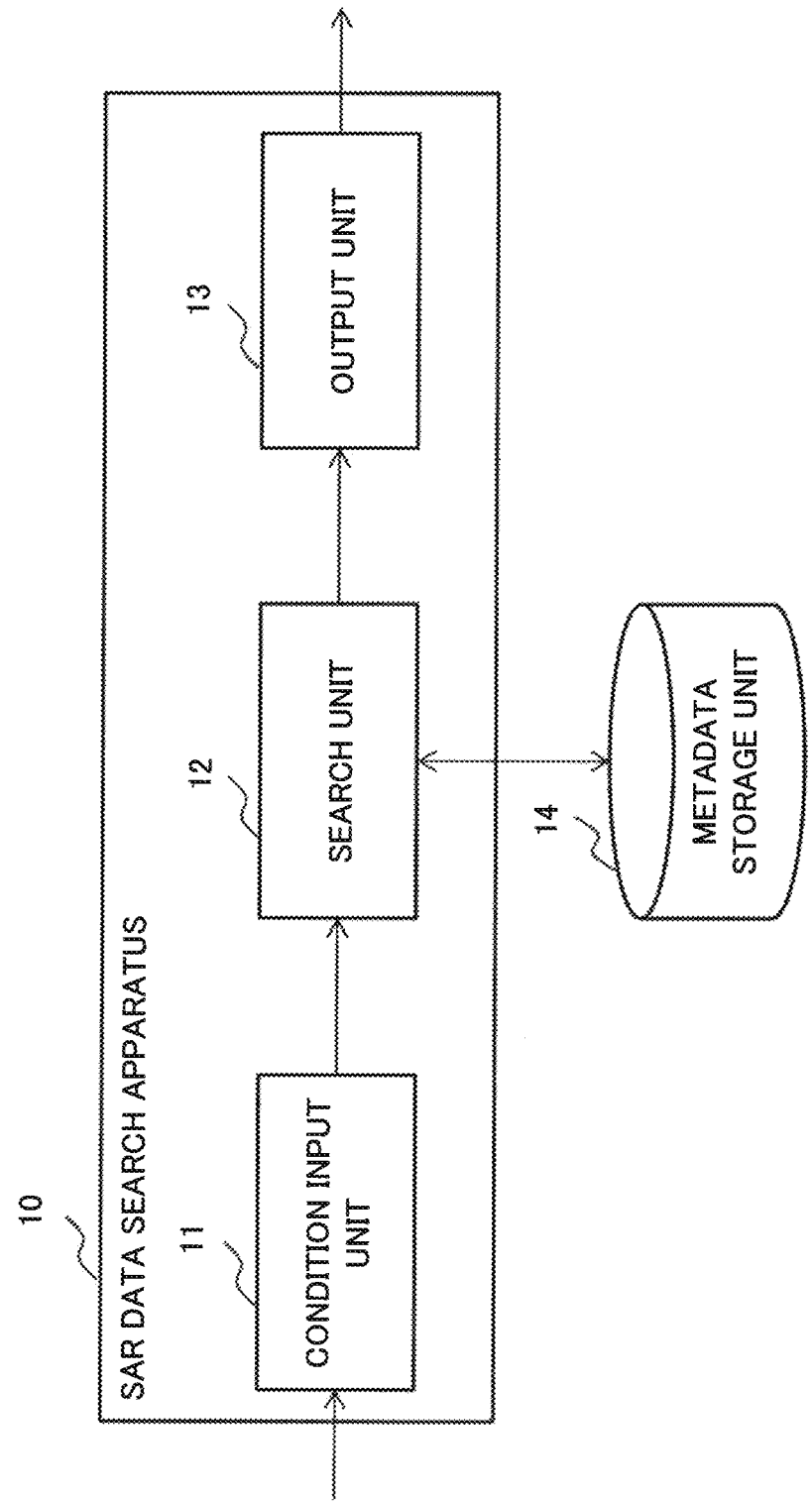
FIG. 1 shows a diagram illustrating a configuration example of an SAR data search apparatus in first and second example embodiments of the present invention.

FIG. 1 illustrates a configuration example of an SAR data search apparatus in the example embodiment.

Note that directions of arrows in the drawing indicate an example, and do not limit directions of signals between blocks. Further, the same definition as described above is also applied to the other drawings.

The SAR data search apparatus 10 is constituted by a condition input unit 11, a search unit 12, and an output unit 13.

The condition input unit 11 is a portion configured to receive an input of a search condition. The search condition includes a search purpose and an observation date/time condition.

The search unit 12 is a portion configured to switch an observation date/time condition to be used as a search condition, depending on a search purpose, and to extract a set of SAR data that satisfies the search condition from a metadata storage unit 14. The metadata storage unit 14 is a portion configured to store metadata including identification information of each piece of SAR data, and observation dates/times. Note that the metadata storage unit 14 may be configured within the SAR data search apparatus 10, or may be constituted as an external device other than the SAR data search apparatus 10.

The output unit 13 is a portion configured to output identification information of each piece of SAR data in an extracted set of SAR data.

By configuring the SAR data search apparatus 10 as described above, it is possible to change the search condition of SAR data, depending on a purpose of generating InSAR data.

Figure 2:
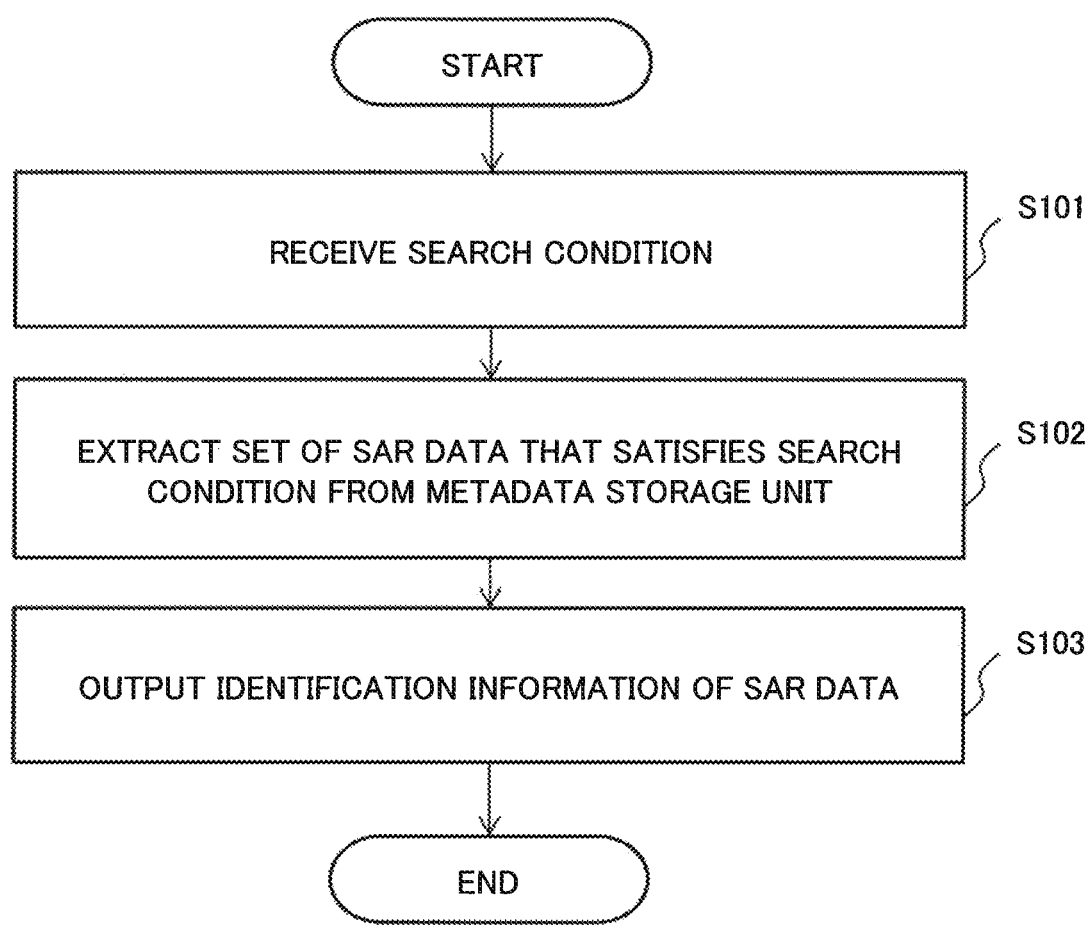
FIG. 2 shows a diagram illustrating an operation example of the SAR data search apparatus in the first and second example embodiments of the present invention.

Next, FIG. 2 illustrates an operation example of the SAR data search apparatus 10 in the example embodiment.

First of all, the condition input unit 11 receives a search condition (Step S101). The search condition includes a search purpose and an observation date/time condition.

Next, the search unit 12 switches an observation date/time condition to be used as a search condition, depending on a search purpose, and extracts a set of SAR data that satisfies the search condition from the metadata storage unit 14 (Step S102).

Further, the output unit 13 outputs identification information of each piece of SAR data in an extracted set of SAR data (Step S103).

By operating the SAR data search apparatus 10 as described above, it is possible to change the search condition of SAR data, depending on a purpose of generating InSAR data.

As described above, in the first example embodiment of the present invention, a set of SAR data that satisfies an observation date/time condition, depending on a search purpose and the other search conditions is extracted. Therefore, it is possible to change the search condition of SAR data depending on a purpose of generating InSAR data. Further, it is possible to search a set of SAR data optimum for a purpose of generation.

[Second Example Embodiment]

Next, the second example embodiment of the present invention is described.

A configuration example and an operation example of an SAR data search apparatus 10 in the present example embodiment are the same as those in FIG. 1 and FIG. 2.

In the present example embodiment, an operation example of the SAR data search apparatus 10 in the present example embodiment described in the first example embodiment is described specifically by an example, in which SAR data acquired by an artificial satellite are searched.

A metadata storage unit 14 is a portion configured to store metadata including identification information of each piece of SAR data, an observation range, position information of a flying object, observation direction information, and observation dates/times. As an observation range, for instance, the metadata storage unit 14 stores geographical information such as latitudes/longitudes or UTM (Universal Transverse Mercator) coordinates. As position information of a flying object, for instance, the metadata storage unit 14 stores orbit information in an inertia coordinate system of a flying object loaded with an SAR sensor. Further, as observation direction information, the metadata storage unit 14 stores attitude information represented by a three-axis attitude angle or a quaternion.

First of all, a condition input unit 11 receives a search condition (Step S101). The search condition includes a search purpose (G1), an observation position condition (G2), a distance condition (G3) of two flying objects, and an observation date/time condition (G4) depending on a search purpose.

Input of a search condition to the condition input unit 11 is available by an input means provided in the SAR data search apparatus 10, a user end device other than the SAR data search apparatus 10, or the like. Herein, description is made based on the premise that a user end device is used.

As the search purpose (G1), for instance, there are generation of DSM data to be used for altitude analysis, and generation of DInSAR data to be used for crustal deformation analysis. The condition input unit 11 receives the observation date/time condition (G4) depending on the search purpose (G1).

In a case where the search purpose (G1) is generation of DSM data, the condition input unit 11 receives, as the observation date/time condition (G4), an observation date/time of SAR data a user wishes to use as master data (hereinafter, an observation date/time condition of master data). In a case where the search purpose is generation of DInSAR data, the condition input unit 11 receives an observation date/time of SAR data a user wishes to use as master data, and an observation date/time of SAR data the user wishes to use as slave data (hereinafter, an observation date/time condition of slave data).

Herein, as a method for receiving an observation date/time condition depending on a search purpose, for instance, there is a method, in which the condition input unit 11 that receives a search purpose requests a search condition depending on the search purpose to a user end device, and the user end device performs display that prompts a user to input the requested search condition. Further, a user end device may directly perform display that prompts a user to input a search condition depending on a search purpose. FIG. 3 illustrates an example of display on a user end device. FIG. 3(a) illustrates an example of display in a case where the search purpose is generation of DSM data, and FIG. 3(b) illustrates an example of display in a case where the search purpose is generation of DInSAR data.

Figure 10:
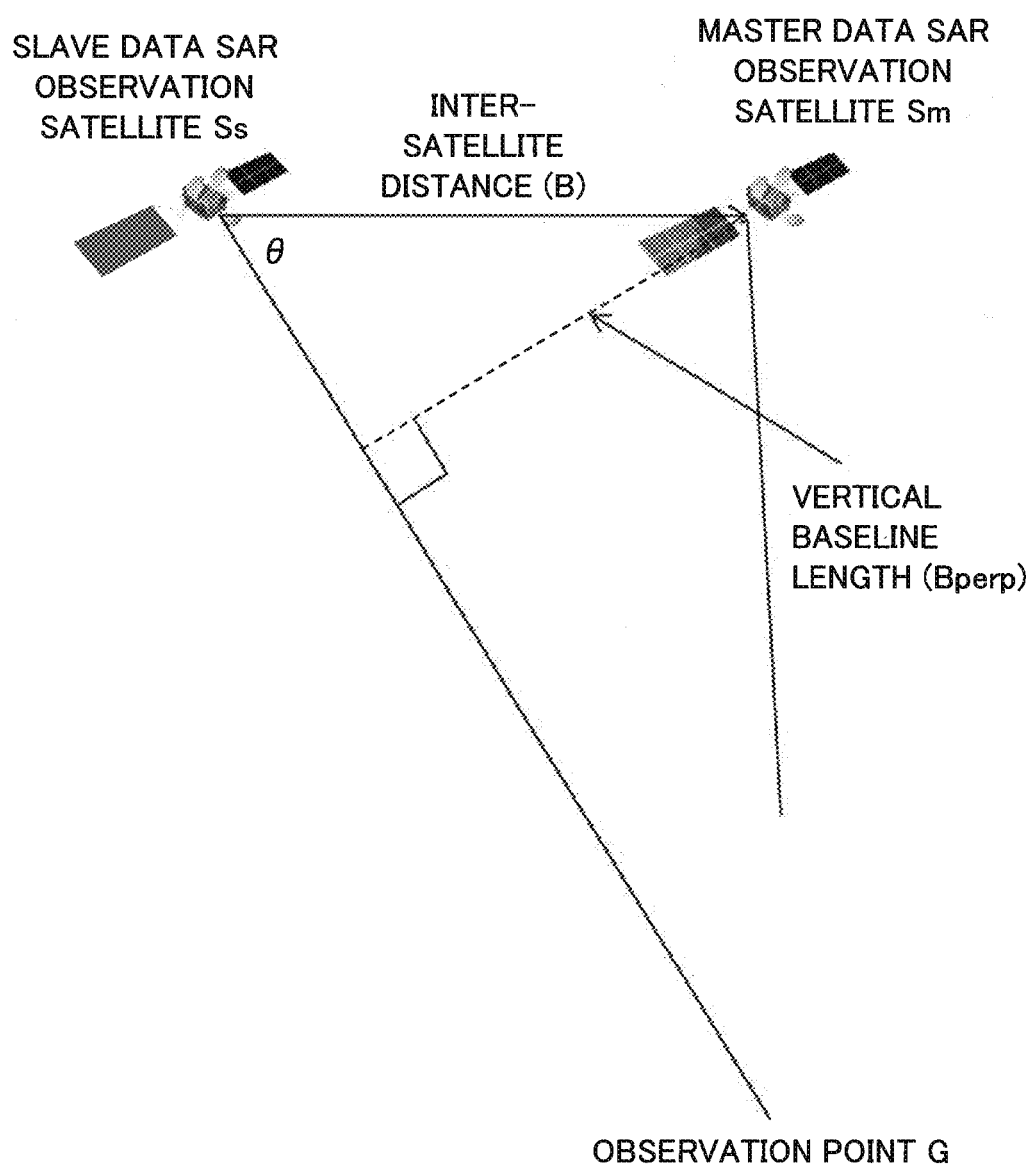
FIG. 10 shows a diagram illustrating description of a vertical baseline length.

The observation position condition (G2) is information relating to a geographical area in which a user wishes to search a set of SAR data. As the distance condition (G3) of two flying objects, for instance, a vertical baseline length (Bperp) for master data and slave data is used. In FIG. 10, when it is assumed that Sm is a satellite position of a master data SAR observation satellite, Ss is a satellite position of a slave data SAR observation satellite, and G is an observation point on the earth's surface by the slave data SAR observation satellite, the vertical baseline length Bperp is a length of a line perpendicular to a straight line SsG from Sm. When it is assumed that B is an inter-satellite distance between Sm and Ss, and θ is an angle defined by a straight line SsSm and the straight line SsG, it is possible to calculate the value of Bperp by Eq. (1). Herein, it is assumed that the condition input unit 11 receives a threshold value (a maximum value) of the vertical baseline length as the distance condition (G3).

$$Bperp = B\sin\theta \qquad \text{Eq. (1)}$$

Where $$\theta = \cos^{-1}\left(\frac{\overrightarrow{SsSm} \cdot \overrightarrow{SsG}}{|\overrightarrow{SsSm}||\overrightarrow{SsG}|}\right)$$

Next, a search unit 12 extracts, from the metadata storage unit 14, a set of SAR data that satisfies a search condition (Step S102). In the present example embodiment, a pair of master data and slave data is extracted.

First of all, the search unit 12 searches the metadata storage unit 14, based on the observation position condition (G2). By the search, the search unit 12 acquires SAR metadata in data at a geographical position that satisfies the observation position condition (G2). Metadata includes correspondence with respect to SAR data as original data as identification information. Therefore, data to be acquired by the search unit 12 are identification information. In this case, in a case where there exist a plurality of pieces of metadata that satisfy the observation position condition, the number of pieces of identification information to be acquired is also plural. The acquired pieces of identification information are set as candidate data T1.

In a case where the number of pieces of identification information included in the candidate data T1 is one or less, it is not possible to extract a pair. Therefore, the search unit 12 outputs a result indicating that there is no candidate data to an output unit 13. In a case where the number of pieces of candidate data is two or more, the candidate data T1 is further discriminated based on the distance condition (G3) of two flying objects.

First of all, the search unit 12 searches the metadata storage unit 14 by using identification information included in the candidate data T1 as a search keyword, and acquires an observation range, position information of flying objects, observation direction information, and observation dates/times, associated with the identification information. Therefore, a set of data on an observation range, position information of flying objects, observation direction information, and observation dates/times is acquired by the number equal to the number of pieces of identification information included in candidate data. In a case where the candidate data T1 includes a plurality of pieces of identification information, it is possible to generate SAR data pairs by the number twice as large as the number of combinations (the number is twice because combination in which master data and slave data are exchanged is also considered).

Further, the search unit 12 calculates a vertical baseline length for each pair, based on an observation range, position information of flying objects, observation direction information, and observation dates/times, associated with identification information of each piece of SAR data. In FIG. 10, the master data observation satellite position Sm and the slave data observation satellite position Ss are calculated from observation dates/times, position information of flying objects, and observation direction information. The observation point G is obtained from an observation range (e.g. a center position of an observation range), position information, and observation direction information. Further, the search unit 12 judges whether a calculated vertical baseline length is equal to or smaller than a threshold value of the distance condition (G3).

Identification information of each piece of SAR data of each pair, observation dates/times, and information on a calculated vertical baseline length for each pair are set as new candidate data T2 regarding all the pairs whose vertical baseline length is equal to or smaller than a threshold value. Therefore, the new candidate data T2 includes identification information of a plurality of pairs, an observation date/time of SAR data associated with each piece of identification information, and a vertical baseline length for each pair. In a case where the candidate data T2 do not include a pair, the search unit 12 outputs a result indicating that there is no candidate data to the output unit 13.

Next, in a case where the candidate data T2 include one or more pairs, the search unit 12 further discriminates the candidate data T2, based on the observation date/time condition (G4). In a case where there are SAR data which are far from the observation date/time condition (G4) by a predetermined period or longer by referring to the observation date/time of each piece of SAR data included in the candidate data T2, the search unit 12 deletes a pair including the SAR data from the candidate data T2, and sets the remaining pair or pairs as new candidate data T3.

For instance, in a case where generation of DSM data is a purpose, the search unit 12 leaves a pair of SAR data that satisfies the following condition as the candidate data T3:

In a case where the observation date/time of master data is within a predetermined range from an observation date/time condition; and
in a case where the interval between observation dates/times of master data and slave data is within a predetermined range.

On the other hand, in a case where generation of DInSAR data is a purpose, the search unit 12 leaves a pair of SAR data that satisfies the following condition as the candidate data T3:

In a case where the observation date/time of master data is within a predetermined range from an observation date/time condition; and
in a case where the observation date/time of slave data is within a predetermined range from an observation date/time condition.

In a case where the candidate data T3 do not include a pair, the search unit 12 outputs a result indicating that there is no candidate data to the output unit 13. Further, in a case where the candidate data T3 include one or more pairs, the search unit 12 outputs identification information of the pair or pairs included in the candidate data T3 to the output unit 13 (Step S103). In this case, in a case where the candidate data T3 include a plurality of pairs, the search unit 12 may rearrange and output the pairs in a predetermined order in such a manner that a pair whose observation date/time is nearer the observation date/time condition is output earlier, or a pair whose vertical baseline length is shorter is output earlier. Alternatively, the search unit 12 may output a vertical baseline length and an observation date/time together with identification information, and may rearrange and display the pairs by a user end device.

As described above, in the second example embodiment of the present invention, as well as the first example embodiment, a set of SAR data that satisfies an observation date/time condition depending on a search purpose, and the other search conditions is extracted. Therefore, it is possible to change the search condition of SAR data, depending on a purpose of generating InSAR data. Further, it is possible to search a set of SAR data optimum for a purpose of generation.

[Third Example Embodiment]

Next, the third example embodiment of the present invention is described.

The present example embodiment is a configuration, in which a configuration such that an index is calculated for each extracted set of SAR data, is added to the first and second example embodiments.

Figure 4:
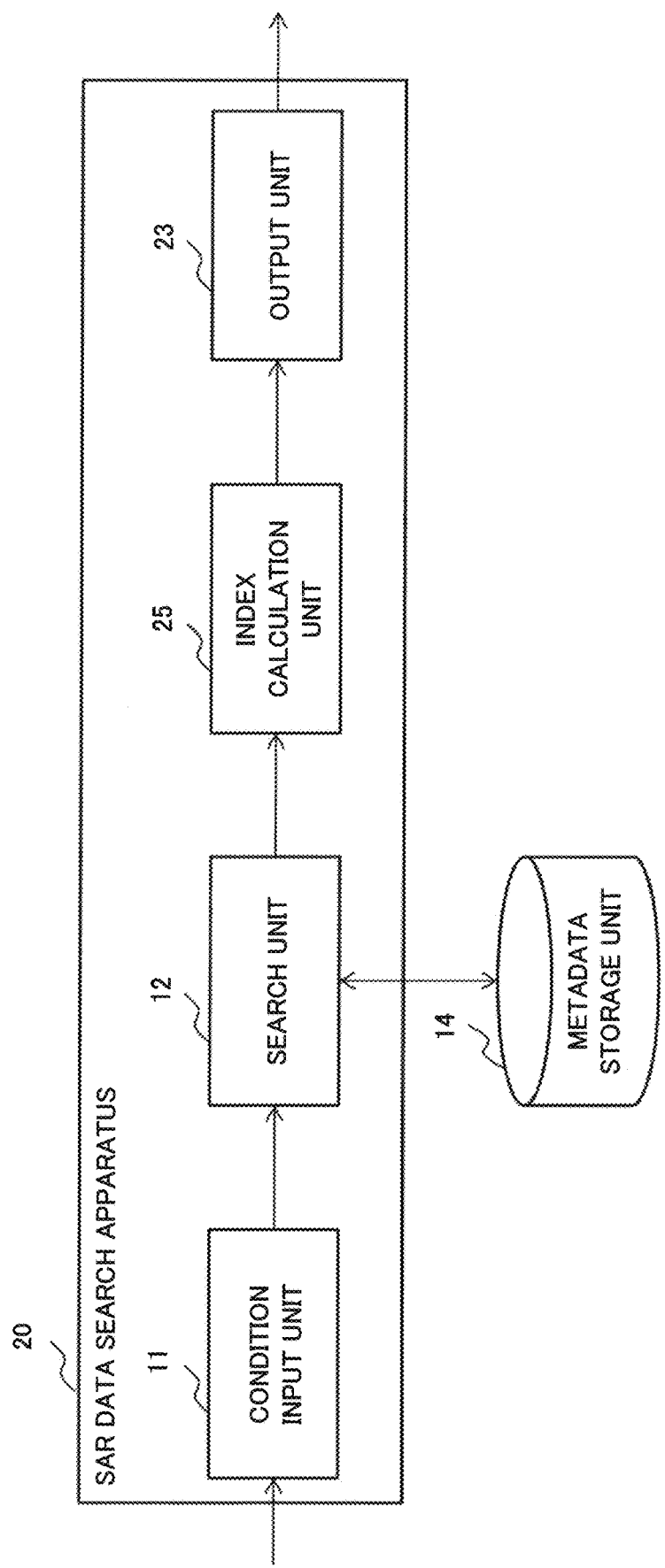
FIG. 4 shows a diagram illustrating a configuration example of an SAR data search apparatus in third and fourth example embodiments of the present invention.

FIG. 4 illustrates a configuration example of an SAR data search apparatus 20.

The SAR data search apparatus 20 is constituted by a condition input unit 11, a search unit 12, an output unit 23, and an index calculation unit 25. The condition input unit 11 and the search unit 12 are the same as those in the first example embodiment.

The index calculation unit 25 is a portion configured to calculate an index for each set of SAR data extracted by the search unit 12.

The output unit 23 is a portion configured to output identification information of each piece of SAR data in an extracted set together with an index calculated by the index calculation unit 25.

By configuring the SAR data search apparatus 20 as described above, it is possible to change the search condition of SAR data, depending on a purpose of generating InSAR data. Further, it is possible to present a search result together with an index to a user.

Figure 5:
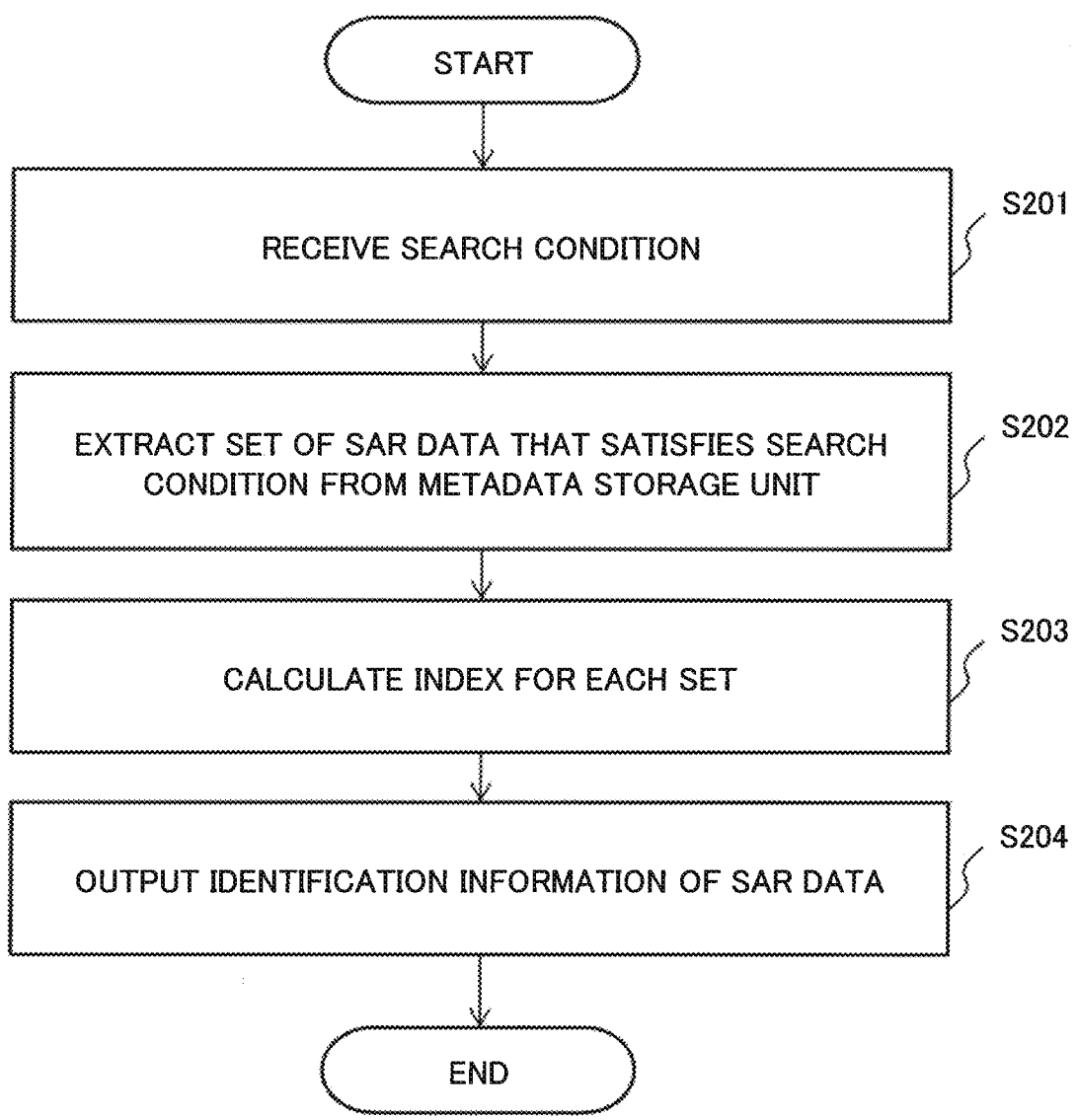
FIG. 5 shows a diagram illustrating an operation example of the SAR data search apparatus in the third and fourth example embodiments of the present invention.

Next, FIG. 5 illustrates an operation example of the SAR data search apparatus 20 in the present example embodiment. Note that Steps S201, S202, and S204 respectively correspond to Steps S101, S102, and S103 in FIG. 2.

First of all, the condition input unit 11 receives a search condition (Step S201). The search condition includes a search purpose and an observation date/time condition.

Next, the search unit 12 switches an observation date/time condition to be used as a search condition, depending on a search purpose, and extracts a set of SAR data that satisfies the search condition from a metadata storage unit 14 (Step S202).

Next, the index calculation unit 25 calculates an index for each set of SAR data extracted by the search unit 12 (Step S203).

Further, the output unit 23 outputs identification information of each piece of SAR data in an extracted set of SAR data together with an index (Step S204).

By operating the SAR data search apparatus 20 as described above, it is possible to change the search condition of SAR data, depending on a purpose of generating InSAR data. Further, it is possible to present a search result together with an index to a user.

Next, an operation example of the SAR data search apparatus 20 in the present example embodiment is described specifically by an example, in which SAR data acquired by an artificial satellite are searched, and a set (a pair) of master data and slave data is extracted.

An operation until candidate data T1 is discriminated based on a distance condition (G3), and new candidate data T2 are extracted is the same as the operation described in the second example embodiment.

In the present example embodiment, in a case where a plurality of pairs of SAR data are extracted, the index calculation unit 25 calculates an index for each pair (Step S203).

Figure 6:
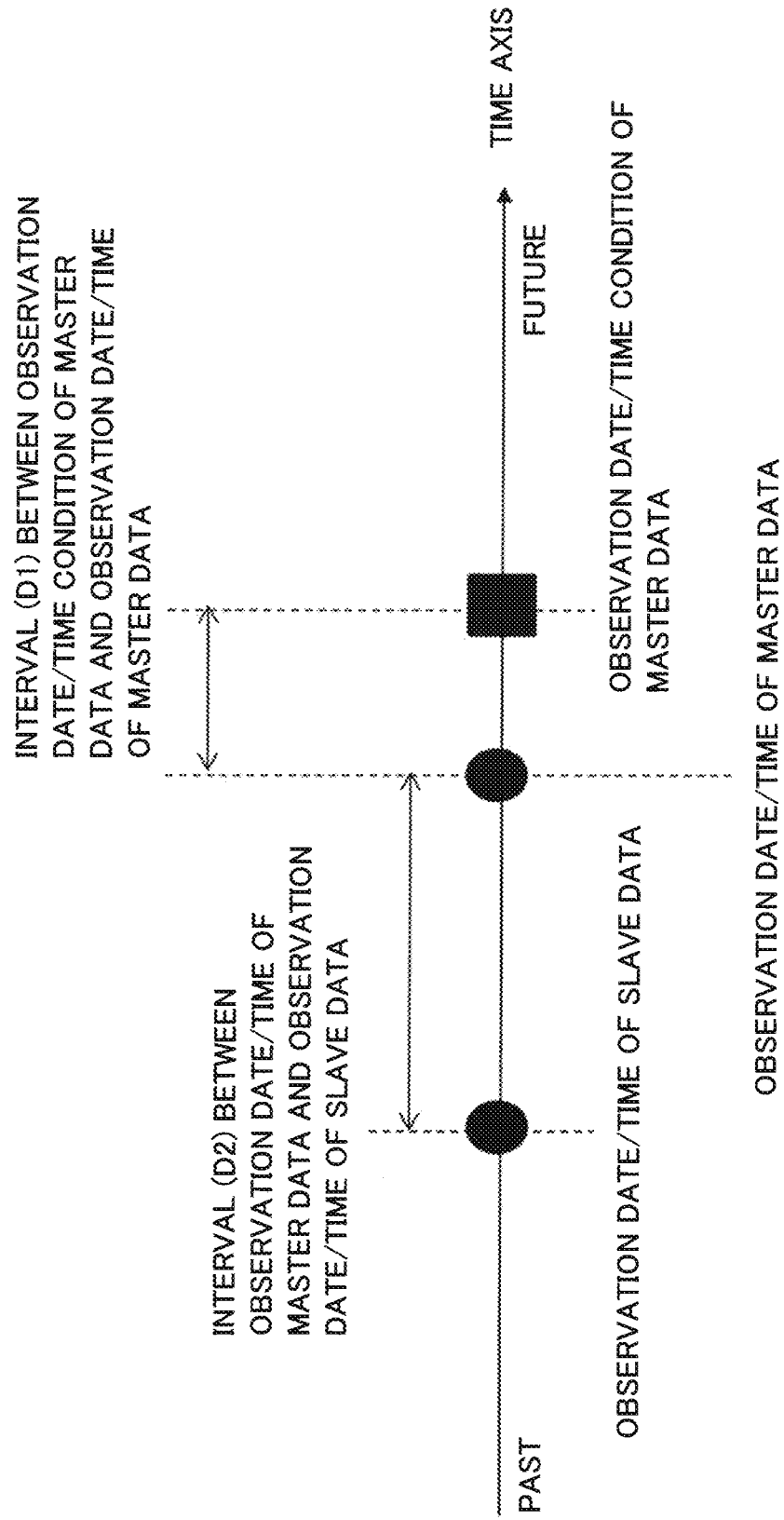
FIG. 6 shows a diagram illustrating a relationship between observation dates/times in the third and fourth example embodiments of the present invention.

In a case where a search purpose is generation of DSM data, for instance, an index S is calculated by Eq. (2). D1 is an interval between an observation date/time condition of master data, and an observation date/time of master data. D2 is an interval between an observation date/time of master data, and an observation date/time of slave data. A relationship between these intervals is illustrated in FIG. 6. An observation date/time condition of master data is an observation date/time condition (G4) to be input to the condition input unit 11. α1, β1, and γ1 are real numbers, and are set in advance based on a search criterion such as whether a vertical baseline length is prioritized, or an observation date/time interval is prioritized. The smaller the index S is, the more appropriate the SAR data pair is for generation of DSM data.

$$S = \alpha 1 D1 + \beta 1 D2 + \gamma 1 Bperp \qquad \text{Eq.(2)}$$

Figure 7:
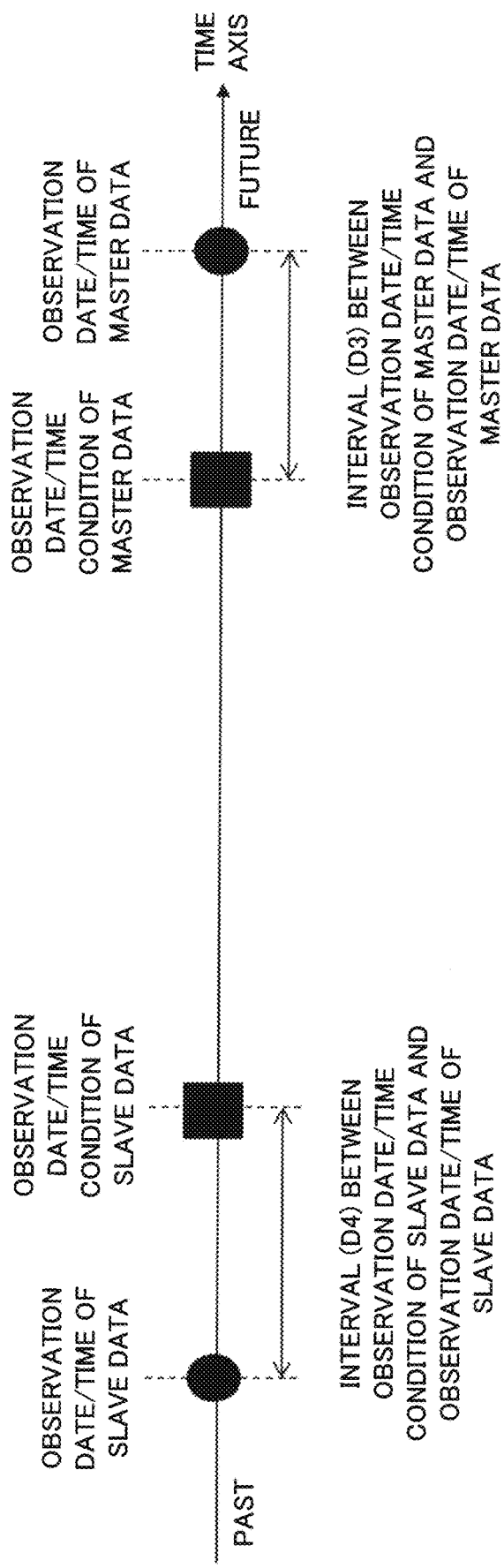
FIG. 7 shows a diagram illustrating a relationship between observation dates/times in the third and fourth example embodiments of the present invention.

In a case where a search purpose is generation of DInSAR data, for instance, an index S is calculated by Eq. (3). D3 is an interval between an observation date/time condition of master data, and an observation date/time of master data. D4 is an interval between an observation date/time condition of slave data, and an observation date/time of slave data. A relationship between these intervals is illustrated in FIG. 7. An observation date/time condition of master data and an observation date/time condition of slave data are an observation date/time condition (G4) to be input to the condition input unit 11. α2, β2, and γ2 are real numbers, and are set in advance based on a search criterion such as whether a vertical baseline length is prioritized, or an observation date/time interval is prioritized. The smaller the index S is, the more appropriate the SAR data pair is for generation of DInSAR data.

$$S = \alpha 2 D3 + \beta 2 D4 + \gamma 2 Bperp \qquad \text{Eq. (3)}$$

The candidate data T2 to be input to the index calculation unit 25 include identification information of each piece of SAR data of each pair, observation dates/times, and information on a calculated vertical baseline length for each pair. Regarding each pair, the index calculation unit 25 calculates D1 and D2, or D3 and D4 from observation dates/times included in candidate data, and the observation date/time condition (G4). Further, the index calculation unit 25 calculates the index S by applying these values and a calculated vertical baseline length included in candidate data to Eq. (2) or Eq. (3).

An index is calculated for each pair as described above, and identification information of each pair and calculated indexes are output to an output unit 13 as a search result. In this case, pairs may be rearranged in the increasing order of the index. Further, the rearrangement may be performed by a user end device.

The output unit 13 outputs a search result received from the index calculation unit 25 to a user end device (Step S204). The user end device that receives the search result performs display such as displaying SAR data pairs in the increasing order of the index. Further, in a case where information indicating that there is no candidate data is input from the search unit 12, the output unit 13 outputs information indicating that there is no search result to the user end device, and the user end device displays a message indicating that there is no search result, or the like.

By operating the SAR data search apparatus 20 as described above, it is possible to search SAR data that satisfy an observation position condition, a distance condition, and an observation date/time condition depending on a search purpose. Further, it is also possible to cause a user end device to preferentially display an SAR data pair, in which a vertical baseline length between the SAR data pair is short, and observation dates/times are near the observation date/time condition.

In a case where InSAR data are generated for the purpose of generating DSM data, an SAR data pair, in which a vertical baseline length between the SAR data pair is short, and observation dates/times of master data and slave data are near, is preferentially output as a search result. Further, in a case where InSAR data are generated for the purpose of generating DInSAR data, master data and slave data, in which a vertical baseline length between an SAR data pair is small, and observation dates/times at two times of which a user wishes to analyze are near, are preferentially output as a search result. Thus, it is possible to improve the quality of InSAR data to be generated from an SAR data pair to thereby improve the quality of DSM data or DInSAR data.

As described above, in the third example embodiment of the present invention, as well as the first and second example embodiments, a set of SAR data that satisfies an observation date/time condition depending on a search purpose, and the other search conditions is extracted. Therefore, it is possible to change the search condition of SAR data, depending on a purpose of generating InSAR data. Further, it is possible to search a set of SAR data optimum for a purpose of generation. Furthermore, by calculating an index for each searched set of SAR data, it is possible to preferentially present to a user a set, which is more appropriate as a search result. This makes it possible to improve the quality of InSAR data to be generated.

[Fourth Example Embodiment]

Next, the fourth example embodiment of the present invention is described.

It is possible to obtain DInSAR data from which crustal deformation is analyzable by removing terrain influence of InSAR data from the InSAR data with use of digital terrain model data. As digital terrain model data, it is possible to use existing DEM (Digital Elevation Model) data such as 10-m-mesh digital elevation model provided by the Geospatial Information Authority of Japan. Further, it is also possible to generate and use DSM data from another SAR data pair.

The present example embodiment is an embodiment, in which a configuration such that searching an SAR data pair for the purpose of generating DSM data for generating DInSAR data is enabled is added, in addition to an SAR data pair for generating DInSAR data, in a case where a search purpose is generating DInSAR data. Note that this configuration may be added to the second or third example embodiment.

A configuration example and an operation example of the SAR data search apparatus 20 in the present example embodiment are the same as those in FIG. 4 and FIG. 5.

Figure 8:
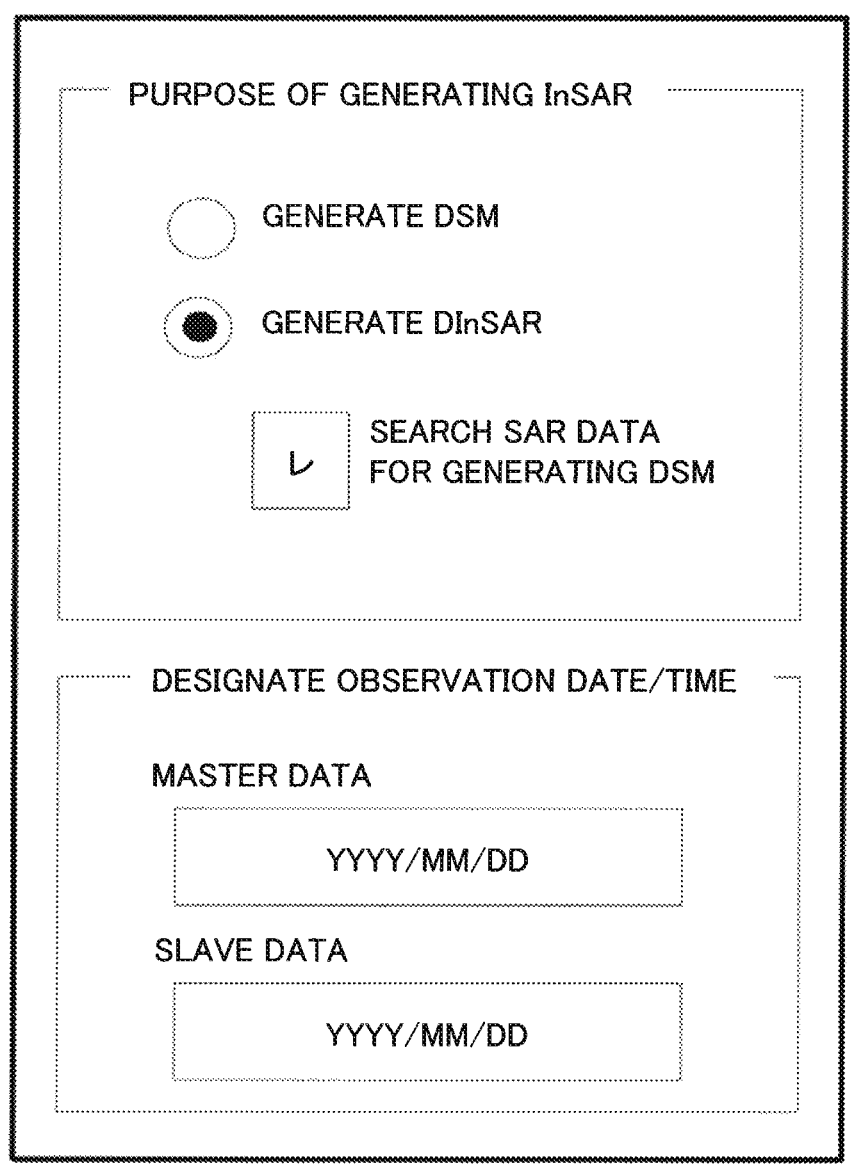
FIG. 8 shows a diagram illustrating an example of display by a user end device in the fourth example embodiment of the present invention.

A condition input unit 11 receives generation of DSM data or generation of DInSAR data, as a search purpose. Further, in a case where a search purpose is generation of DInSAR data, a condition input unit 11 further receives whether or not DSM data for generating DInSAR data are generated. In a case where a search purpose (G1) is generating DInSAR data, and DSM data are also generated, the condition input unit 11 receives an observation date/time condition of master data and an observation date/time condition of slave data, as an observation date/time condition (G4). FIG. 8 is an example of display of a user end device, in a case where a search purpose is generating DInSAR data, and DSM data are also generated. The other search conditions are the same as the description in the third example embodiment.

In a case where DSM data for generating DInSAR data are generated, a search unit 12 extracts slave data for generating DInSAR data, and slave data 2 for generating DSM data for one piece of master data. The following description is made in a case where DSM data for generating DInSAR data are generated.

First of all, as well as the third example embodiment, the search unit 12 searches a metadata storage unit 14, based on an observation position condition (G2), and extracts candidate data T1. In a case where DSM data for generating DInSAR data are generated, three pieces of SAR data are necessary. Therefore, in a case where the number of pieces of identification information of SAR data included in the candidate data T1 is two or less, the search unit 12 outputs a result indicating that there is no candidate data to an output unit 23. In a case where the number of pieces of identification information included in the candidate data T1 is three or more, the search unit 12 further discriminates the candidate data T1, based on a distance condition (G3).

The search unit 12 discriminates the candidate data T1, based on the distance condition (G3) by the same method as used in the third example embodiment, and sets new candidate data T2.

Note that unlike the third example embodiment, new candidate data are such that master data, slave data, and slave data 2 for generating DSM data, namely, three pieces of SAR data in total constitute one data set. In a case where the number of pieces of identification information included in candidate data extracted based on the observation position condition (G2) is N, it is possible to express the number of SAR data pairs by Eq. (4). On the other hand, in a case where three pieces of SAR data constitute one of data set, it is possible to express the total number of data sets by Eq. (5) (the total number of data sets is six times as large as the number of combinations, because combination in which master data, slave data, and slave data 2 are exchanged is considered).

$$\text{number of pairs} = {}_NC_2 \times 2 = {}_NP_2 \qquad \text{Eq.(4)}$$

$$\text{number of data sets} = {}_NC_3 \times 6 = {}_NP_3 \qquad \text{Eq.(5)}$$

Two vertical baseline lengths i.e. a vertical baseline length (Bperp) for master data and slave data, and a vertical baseline length (Bperp2) for master data and slave data 2 are calculated with respect to one data set. Further, it is judged whether or not both of the calculated vertical baseline lengths are equal to or smaller than a threshold value of the distance condition (G3).

Regarding all the data sets, in each of which a vertical baseline length is equal to or smaller than a threshold value, identification information of each piece of SAR data of each data set, observation dates/times, and information (Bperp and Bperp2) on a calculated vertical baseline length in each data set are set as new candidate data T2. Therefore, the new candidate data T2 include identification information of a plurality of data sets, observation dates/times of SAR data associated with each piece of identification information, and a vertical baseline length in each data set. In a case where candidate data do not include a data set, the search unit 12 outputs a result indicating that there is no candidate data to the output unit 23.

In a case where a plurality of data sets of SAR data are extracted, an index calculation unit 25 calculates an index for each data set.

Figure 9:
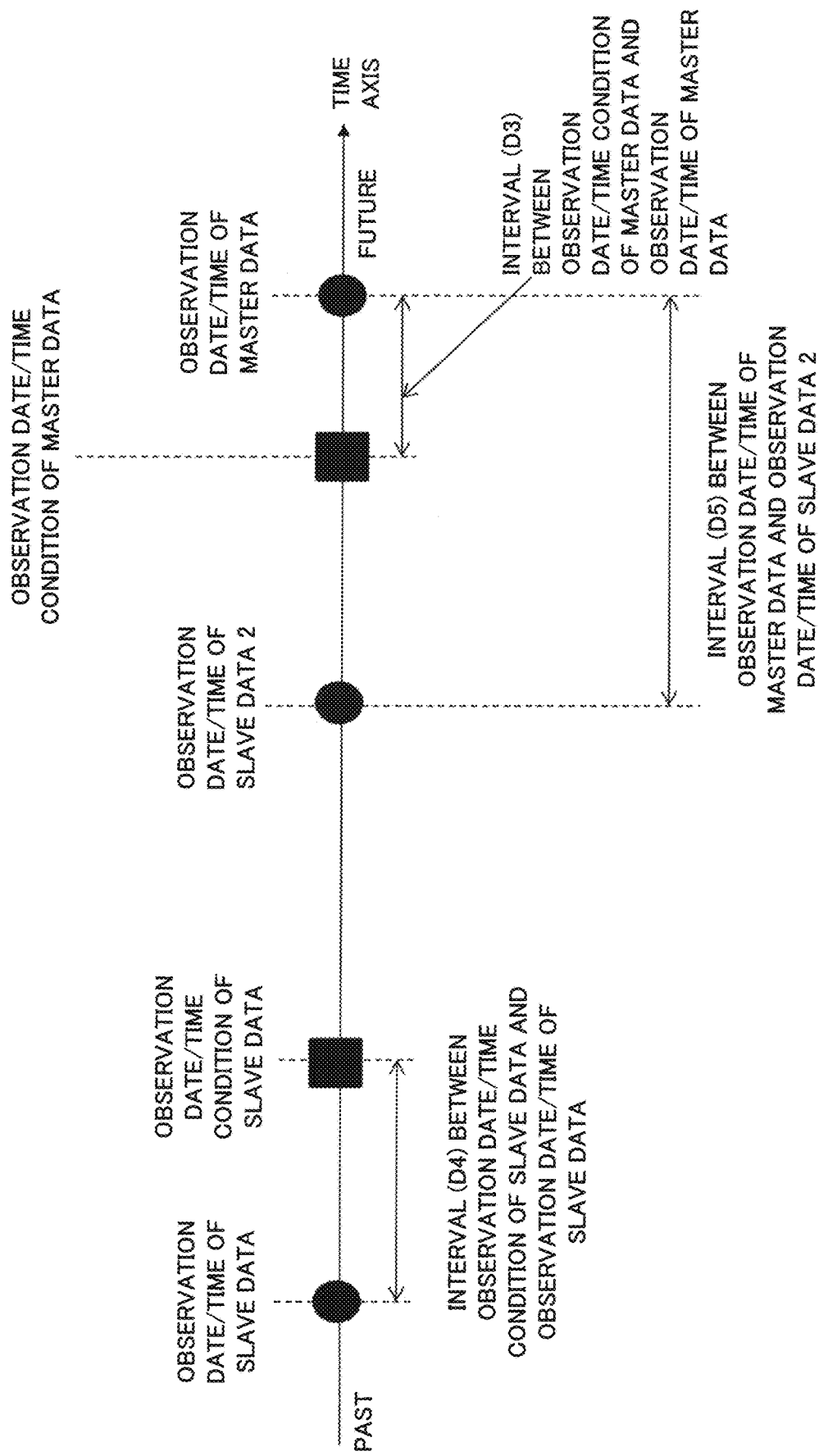
FIG. 9 shows a diagram illustrating a relationship between observation dates/times in the fourth example embodiment of the present invention.

The index calculation unit 25 calculates an index S by Eq. (6), for instance. D3 is an interval between an observation date/time condition of master data, and an observation date/time of master data. D4 is an interval between an observation date/time condition of slave data, and an observation date/time of slave data. D5 is an interval between an observation date/time of master data, and an observation date/time of slave data 2. A relationship between these intervals is illustrated in FIG. 9. $\alpha 3$, $\beta 3$, $\gamma 3$, $\delta 3$, and $\epsilon 3$ are arbitrary real numbers, and are set in advance, based on a search criterion such as whether a vertical baseline length is prioritized, or an observation date/time interval is prioritized. The smaller the index S is, the more appropriate the SAR data pair is for generation of DInSAR data and for generation of DSM data for generating DInSAR data.

$$S = \alpha 3 D3 + \beta 3 D4 + \gamma 3 \text{Bperp} + \delta 3 D5 + \epsilon 3 \text{Bperp2} \qquad \text{Eq.(6)}$$

By operating the SAR data search apparatus 20 as described above, it is possible to search SAR data that satisfy an observation position condition, a distance condition, and an observation date/time condition depending on a search purpose. Further, it is also possible to cause a user end device to preferentially display a set of SAR data, in which a vertical baseline length between SAR data sets is short, and observation dates/times are near the observation date/time condition.

As described above, in the fourth example embodiment of the present invention, as well as the first to third example embodiments, a set of SAR data that satisfies an observation date/time condition depending on a search purpose, and the other search conditions is extracted. Therefore, it is possible to change the search condition of SAR data, depending on a purpose of generating InSAR data. Further, it is possible to search a set of SAR data optimum for a purpose of generation. Further, by calculating an index for each searched set of SAR data, it is possible to preferentially display to a user a set, which is more appropriate as a search result. This makes it possible to improve the quality of InSAR data to be generated.

[Hardware Configuration Example]

There is described a configuration example of hardware resources, based on which an SAR data search apparatus (10, 20) in the aforementioned example embodiments of the present invention is implemented by using one information processing device (a computer). Note that an SAR data search apparatus may be physically or functionally implemented by using at least two information processing devices. Further, an SAR data search apparatus may be implemented as a dedicated device. Further, it is possible to implement only a part of functions of an SAR data search apparatus by using an information processing device.

Figure 11:
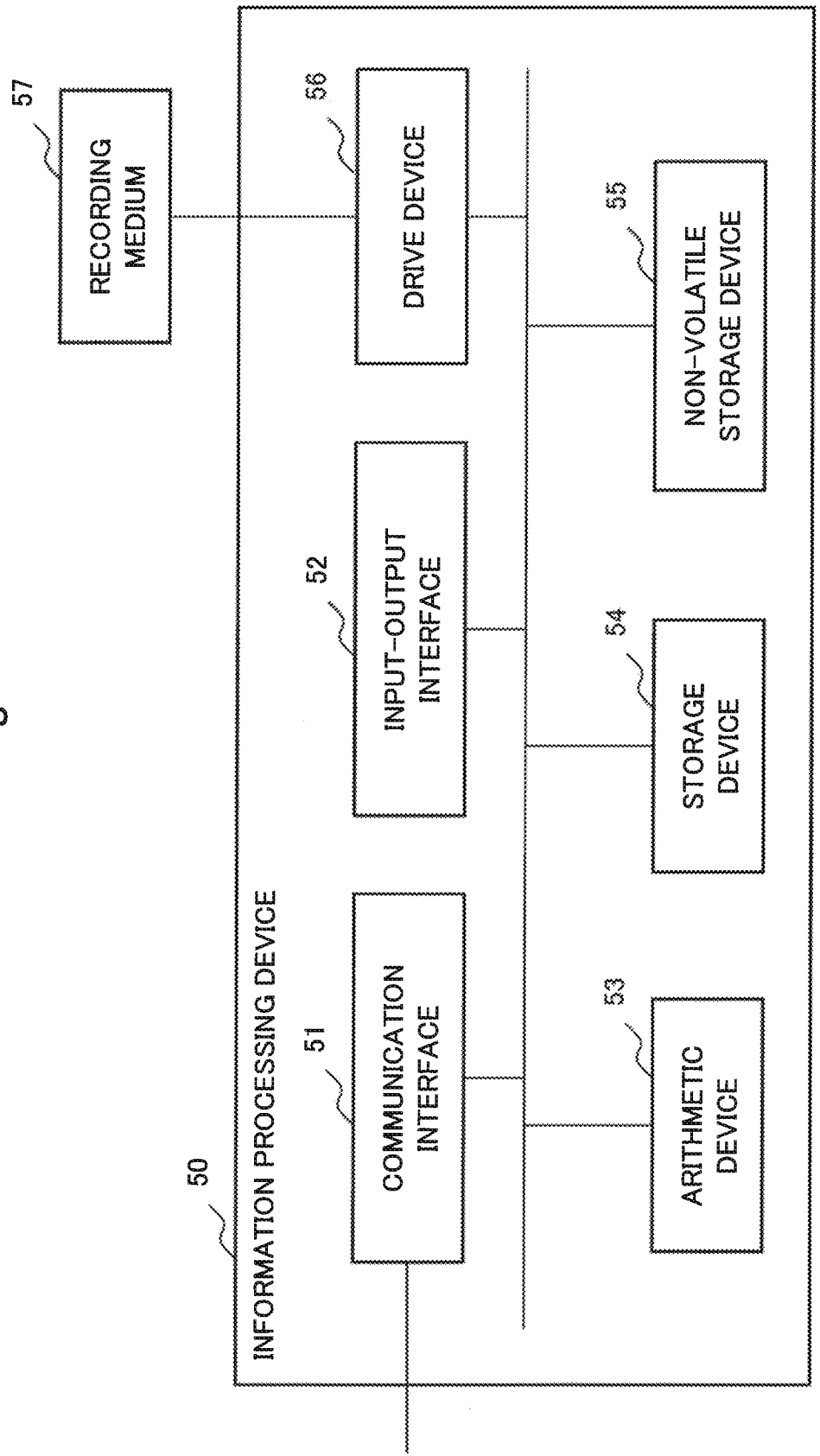
FIG. 11 shows a diagram illustrating a hardware configuration example of the example embodiments of the present invention.

FIG. 11 is a diagram schematically illustrating a hardware configuration example of an information processing device with use of which the SAR data search apparatus of each of the example embodiments of the present invention can be implemented. An information processing device 50 includes a communication interface 51, an input-output interface 52, an arithmetic device 53, a storage device 54, a non-volatile storage device 55, and a drive device 56.

The communication interface 51 is a communication means by which the SAR data search apparatus of each of the example embodiments wiredly or/and wirelessly communicates with an external device. Note that in a case where an SAR data search apparatus is implemented by using at least two information processing devices, these devices may be connected to be mutually communicable via the communication interface 51.

The input-output interface 52 is a man-machine interface such as a keyboard as an example of an input device, or a display as an output device.

The arithmetic device 53 is an arithmetic processing device such as a general-purpose CPU (Central Processing Unit) or a microprocessor. The arithmetic device 53 is capable of reading various programs stored in the non-volatile storage device 55 into the storage device 54, and executing a process in accordance with a read program, for instance.

The storage device 54 is a memory device such as an RAM (Random Access Memory), which is referable from the arithmetic device 53, and stores a program, various data, or the like. The storage device 54 may be a volatile memory device.

The non-volatile storage device 55 is a non-volatile storage device such as an ROM (Read Only Memory) or a flash memory, and is capable of storing various programs, data, and the like, for instance.

The drive device 56 is a device configured to process reading or writing data with respect to a recording medium 57 to be described later, for instance.

The recording medium 57 is an arbitrary recording medium capable of recording data, such as an optical disc, a magneto-optical disk, or a semiconductor flash memory, for instance.

Each of the example embodiments of the present invention may be implemented by configuring an SAR data search apparatus by the information processing device 50 exemplified in FIG. 11, and by supplying a program capable of implementing the functions described in each of the example embodiments to the SAR data search apparatus, for instance.

In this case, it is possible to implement an example embodiment by causing the arithmetic device 53 to execute a program supplied to an SAR data search apparatus. Further, not all of the functions of an SAR data search apparatus but a part of the functions may be configured by the information processing device 50.

Further, the program may be recorded in the recording medium 57, and the program may be stored in the non-volatile storage device 55 as necessary at the time of shipment of an SAR data search apparatus, at an operation time, or the like. Note that in this case, a method for supplying the program may be a method, in which the program is installed in an SAR data search apparatus with use of an appropriate jig at the time of manufacturing before shipment, at an operation time, or the like. Further, a method for supplying the program may also use a general procedure such as a method in which the program is downloaded from the outside via a communication line such as the Internet.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-034759, filed on Feb. 25, 2015, the disclosure of which is incorporated herein in its entirety by reference.

The whole or part of the example embodiments disclosed above can be described as, but not limited to, the following supplementary notes.

(Supplementary Note 1)

An SAR data search apparatus comprising:

a condition input means for receiving an input of a search condition comprising a search purpose and an observation date/time condition;

a search means for switching the observation date/time condition to be used as the search condition, depending on the search purpose, and extracting, from a metadata storage unit configured to store metadata comprising an observation date/time associated with identification information of an SAR (synthetic aperture radar) data, the identification information of a set of the SAR data that satisfies the search condition; and an output means for outputting the extracted identification information of each piece of the SAR data in the set.

(Supplementary Note 2)

The SAR data search apparatus according to Supplementary note 1, wherein the search purpose comprises generating DSM (Digital Surface Model) data or/and generating DInSAR (Differential Interferometric SAR) data.

(Supplementary Note 3)

The SAR data search apparatus according to Supplementary note 2, wherein, when the search purpose is generating DSM data, the search means extracts master data and slave data as the set, and the observation date/time condition comprises a condition relating to the observation date/time of the master data.

(Supplementary Note 4)

The SAR data search apparatus according to Supplementary note 2, wherein, when the search purpose is generating DInSAR data, the search means extracts master data and slave data as the set, and the observation date/time condition comprises a condition relating to the observation dates/times of the master data and the slave data.

(Supplementary Note 5)

The SAR data search apparatus according to Supplementary note 2, wherein, when the search purpose is generating DInSAR data and generating DSM data, the search means extracts master data, first slave data, and second slave data as the set, and the observation date/time condition comprises a condition relating to the observation dates/times of the master data, the first slave data, and the second slave data.

(Supplementary Note 6)

The SAR data search apparatus according to any one of Supplementary notes 1 to 5, further comprising:

an index calculation means for calculating an index regarding each of the set extracted by the search means, wherein the output means outputs the index together with the identification information.

(Supplementary Note 7)

The SAR data search apparatus according to Supplementary note 6, wherein the index is calculated using at least one of an interval between the observation date/time condition and the observation date/time of the SAR data in the set, a distance between flying objects observing respective pieces of the SAR data in the set, and an interval between the observation dates/times of each piece of the SAR data in the set, depending on the search purpose.

(Supplementary Note 8)

The SAR data search apparatus according to any one of Supplementary notes 1 to 7, wherein the search condition comprises a condition of a distance between flying objects observing the SAR data.

(Supplementary Note 9)

The SAR data search apparatus according to Supplementary note 8, wherein the distance is a vertical baseline length between the flying objects.

(Supplementary Note 10)

An SAR data search system comprising:

the SAR data search apparatus according to Supplementary notes 1 to 9;

a metadata storage device configured to store the metadata; and a user end device configured to input the search condition to the condition input means of the SAR data search apparatus, and to receive the identification information of the set of the SAR data from the output means, wherein the search means extracts the identification information of a set of the SAR data that satisfies the search condition from the metadata storage device.

(Supplementary Note 11)

An SAR data search method comprising:

receiving an input of a search condition comprising a search purpose and an observation date/time condition;

switching the observation date/time condition to be used as the search condition, depending on the search purpose, and extracting, from a metadata storage unit configured to store metadata comprising an observation date/time associated with identification information of an SAR data, the identification information of a set of the SAR data that satisfies the search condition; and outputting the extracted identification information of each piece of the SAR data in the set.

(Supplementary Note 12)

The SAR data search method according to Supplementary note 11, wherein the search purpose comprises generating DSM data or/and generating DInSAR data.

(Supplementary Note 13)

The SAR data search method according to Supplementary note 12, wherein, when the search purpose is generating DSM data, the SAR data search method extracts master data and slave data as the set, and the observation date/time condition comprises a condition relating to the observation date/time of the master data.

(Supplementary Note 14)

The SAR data search method according to Supplementary note 12, wherein, when the search purpose is generating DInSAR data, the SAR data search method extracts master data and slave data as the set, and the observation date/time condition comprises a condition relating to the observation dates/times of the master data and the slave data.

(Supplementary Note 15)

The SAR data search method according to Supplementary note 12, wherein, when the search purpose is generating DInSAR data and generating DSM data, the SAR data search method extracts master data, first slave data, and second slave data as the set, and the observation date/time condition comprises a condition relating to the observation dates/times of the master data, the first slave data, and the second slave data.

(Supplementary Note 16)

The SAR data search method according to any one of Supplementary notes 11 to 15, further comprising:

calculating an index for each of the extracted set; and outputting the index together with the identification information.

(Supplementary Note 17)

The SAR data search method according to Supplementary note 16, wherein the index is calculated using at least one of an interval between the observation date/time condition and the observation date/time of the SAR data in the set, a distance between flying objects observing the SAR data in the set, and an interval between the observation dates/times of the SAR data in the set, depending on the search purpose.

(Supplementary Note 18)

The SAR data search method according to any one of Supplementary notes 11 to 17, wherein the search condition comprises a condition of a distance between flying objects observing the SAR data.

(Supplementary Note 19)

The SAR data search method according to Supplementary note 18, wherein the distance is a vertical baseline length between the flying objects.

(Supplementary Note 20)

A computer readable recording medium recorded with an SAR data search program which causes a computer to implement:

a condition input function of receiving an input of a search condition comprising a search purpose and an observation date/time condition;

a search function of switching the observation date/time condition to be used as the search condition, depending on the search purpose, and extracting, from a metadata storage unit configured to store metadata comprising an observation date/time associated with identification information of an SAR data, the identification information of a set of the SAR data that satisfies the search condition; and an output function of outputting the extracted identification information of each piece of the SAR data in the set.

(Supplementary Note 21)

The computer readable recording medium recorded with the SAR data search program according to Supplementary note 20, wherein the search purpose comprises generating DSM data or/and generating DInSAR data.

(Supplementary Note 22)

The computer readable recording medium recorded with the SAR data search program according to Supplementary note 21, wherein, when the search purpose is generating DSM data, the search function extracts master data and slave data as the set, and the observation date/time condition comprises a condition relating to the observation date/time of the master data.

(Supplementary Note 23)

The computer readable recording medium recorded with the SAR data search program according to Supplementary note 21, wherein, when the search purpose is generating DInSAR data, the search function extracts master data and slave data as the set, and the observation date/time condition comprises a condition relating to the observation dates/times of the master data and the slave data.

(Supplementary Note 24)

The computer readable recording medium recorded with the SAR data search program according to Supplementary note 21, wherein, when the search purpose is generating DInSAR data and generating DSM data, the search function extracts master data, first slave data, and second slave data as the set, and the observation date/time condition comprises a condition relating to the observation dates/times of the master data, the first slave data, and the second slave data.

(Supplementary Note 25)

The computer readable recording medium recorded with the SAR data search program according to any one of Supplementary notes 20 to 24, the SAR data search program further causing a computer to implement an index calculation function of calculating an index for each of the set extracted by the search function, wherein the output function outputs the index together with the identification information.

(Supplementary Note 26)

The computer readable recording medium recorded with the SAR data search program according to Supplementary note 25, wherein the index is calculated using at least one of an interval between the observation date/time condition and the observation date/time of the SAR data in the set, a distance between flying objects observing the SAR data in the set, and an interval between the observation dates/times of the SAR data in the set, depending on the search purpose.

(Supplementary Note 27)

The computer readable recording medium recorded with the SAR data search program according to any one of Supplementary notes 20 to 26, wherein the search condition comprises a condition of a distance between flying objects observing the SAR data.

(Supplementary Note 28)

The computer readable recording medium recorded with the SAR data search program according to Supplementary note 27, wherein the distance is a vertical baseline length between the flying objects.

REFERENCE SIGNS LIST 10, 20 SAR data search apparatus
11 Condition input unit
12 Search unit
13, 23 Output unit
25 Index calculation unit

What is claimed is:

1. An SAR data search apparatus comprising:
at least one memory storing instructions, and
at least one processor configured to execute the instructions to:
receive an input of a search condition comprising a search purpose and an observation date/time condition;
switch the observation date/time condition to be used as the search condition, depending on the search purpose;
extract, from stored metadata comprising an observation date/time associated with identification information of an SAR (synthetic aperture radar) data, the identification information of a set of the SAR data that satisfies the search condition; and
output the extracted identification information of each piece of the SAR data in the set.

2. The SAR data search apparatus according to claim 1, wherein
the search purpose comprises generating DSM (Digital Surface Model) data or/and generating DInSAR (Differential Interferometric SAR) data.

3. The SAR data search apparatus according to claim 2, wherein,
when the search purpose is generating DSM data,
the at least one processor is further configured to execute the instructions to extract master data and slave data as the set, and
the observation date/time condition comprises a condition relating to the observation date/time of the master data.

4. The SAR data search apparatus according to claim 2, wherein,
when the search purpose is generating DInSAR data,
the at least one processor is further configured to execute the instructions to extract master data and slave data as the set, and
the observation date/time condition comprises a condition relating to the observation dates/times of the master data and the slave data.

5. The SAR data search apparatus according to claim 2, wherein,
when the search purpose is generating DInSAR data and generating DSM data,
the at least one processor is further configured to execute the instructions to extract master data, first slave data, and second slave data as the set, and
the observation date/time condition comprises a condition relating to the observation dates/times of the master data, the first slave data, and the second slave data.

6. The SAR data search apparatus according to claim 1, wherein the at least one processor is further configured to execute the instructions to:
calculate an index regarding each extracted set; and
output the index together with the identification information.

7. The SAR data search apparatus according to claim 6, wherein
the at least one processor is further configured to execute the instructions to calculate the index using at least one of an interval between the observation date/time condition and the observation date/time of the SAR data in the set, a distance between flying objects observing respective pieces of the SAR data in the set, and an interval between the observation dates/times of each piece of the SAR data in the set, depending on the search purpose.

8. The SAR data search apparatus according to claim 1, wherein
the search condition comprises a condition of a distance between flying objects observing the SAR data.

9. An SAR data search system comprising:
the SAR data search apparatus according to claim 1;
a metadata storage device configured to store the metadata; and
a user end device configured to input the search condition to the SAR data search apparatus, and to receive the identification information of the set of the SAR data from the SAR data search apparatus, wherein
the at least one processor of the SAR data search apparatus is further configured to execute the instructions to extract the identification information of a set of the SAR data that satisfies the search condition from the metadata storage device.

10. An SAR data search method comprising:
receiving an input of a search condition comprising a search purpose and an observation date/time condition;
switching the observation date/time condition to be used as the search condition, depending on the search purpose, and extracting, from stored metadata comprising an observation date/time associated with identification information of an SAR data, the identification information of a set of the SAR data that satisfies the search condition; and
outputting the extracted identification information of each piece of the SAR data in the set.

11. A non-transitory computer readable recording medium recorded with an SAR data search program which causes a computer to:
receive an input of a search condition comprising a search purpose and an observation date/time condition;
switch the observation date/time condition to be used as the search condition, depending on the search purpose, and extract, from stored metadata comprising an observation date/time associated with identification information of an SAR data, the identification information of a set of the SAR data that satisfies the search condition; and
output the extracted identification information of each piece of the SAR data in the set.

* * * * *